US008861121B2

(12) United States Patent
Underkofler (10) Patent No.: US 8,861,121 B2
(45) Date of Patent: Oct. 14, 2014

(54) CLOSED LOOP CONTROL OF TAPE MEDIA POSITIONING WITHIN TAPE DRIVE USING POSITION ERROR SIGNAL FEEDBACK

(71) Applicant: Oracle International Corporation, Redwood City, CA (US)

(72) Inventor: Daniel W. Underkofler, Lafayette, CO (US)

(73) Assignee: Oracle International Corporation, Redwood City, CA (US)

( * ) Notice: Subject to any disclaimer, the term of this patent is extended or adjusted under 35 U.S.C. 154(b) by 141 days.

(21) Appl. No.: 13/660,303

(22) Filed: Oct. 25, 2012

(65) Prior Publication Data

US 2014/0118856 A1    May 1, 2014

(51) Int. Cl.
*G11B 15/60*        (2006.01)
*G11B 5/584*       (2006.01)

(52) U.S. Cl.
CPC .............. *G11B 15/602* (2013.01); *G11B 5/584* (2013.01)
USPC ............................ 360/55; 360/71; 360/77.12

(58) Field of Classification Search
None
See application file for complete search history.

(56) References Cited

U.S. PATENT DOCUMENTS

| | | | |
|---|---|---|---|
| 4,573,619 A * | 3/1986 | Grant | 360/77.12 |
| 4,913,328 A * | 4/1990 | Schulz | 360/71 |
| 4,964,557 A * | 10/1990 | Sarkisian et al. | 360/71 |
| 5,027,231 A * | 6/1991 | Fell | 360/71 |
| 5,267,101 A * | 11/1993 | Choi | 360/70 |
| 5,309,299 A | 5/1994 | Crossland et al. | |
| 5,333,770 A * | 8/1994 | Kano et al. | 226/15 |
| 5,395,067 A * | 3/1995 | Kano et al. | 360/77.12 |
| 6,137,659 A * | 10/2000 | Warmenhoven | 360/261.1 |
| 6,243,225 B1 | 6/2001 | Wyman et al. | |
| 6,633,449 B1 * | 10/2003 | Anderson et al. | 360/71 |
| 6,690,531 B2 | 2/2004 | Richards et al. | |
| 6,690,535 B2 | 2/2004 | Wang | |
| 7,876,521 B2 * | 1/2011 | Cherubini et al. | 360/77.12 |
| 8,643,975 B2 * | 2/2014 | Cherubini et al. | 360/76 |
| 2003/0107836 A1 | 6/2003 | Zweighaft et al. | |
| 2006/0256465 A1 * | 11/2006 | Biskeborn | 360/71 |
| 2014/0016226 A1 * | 1/2014 | Bui et al. | 360/76 |

* cited by examiner

*Primary Examiner* — Wayne Young
*Assistant Examiner* — James L Habermehl
(74) *Attorney, Agent, or Firm* — Marsh Fischmann & Breyfogle LLP; Jonathon A. Szumny (57) ABSTRACT

A control system for a tape drive that uses position error signals (PESs) generated by a tape head assembly of the tape drive during longitudinal movement of a tape through the drive to dynamically adjust a lateral and/or angular position of tape to enhance tape drive performance (e.g., the ability of a tape head assembly to precisely follow one or more data and/or servo tracks on the tape). In one arrangement, the PESs and/or PES metrics are used as feedback into the system to steer the tape by moving one or more tape path guides until subsequently generated PESs or PES metrics have been optimized or have at least moved back into an acceptable range or to acceptable levels. The disclosed control system facilitates achieving increased stringencies on PES minimization that come with increased tape drive magnetic track densities.

14 Claims, 5 Drawing Sheets

CLOSED LOOP CONTROL OF TAPE MEDIA POSITIONING WITHIN TAPE DRIVE USING POSITION ERROR SIGNAL FEEDBACK

BACKGROUND

1. Field of the Invention

The present invention generally relates to data storage devices such as tape drives and, more particularly, to a closed loop servo system that uses position error signals (PESs) generated by a tape drive to dynamically adjust a lateral and/or angular position of tape within the tape drive to enhance tape drive performance.

2. Relevant Background

Tape drives have been widely employed in industry for over thirty years due to their ability to store large amounts of data on a relatively small and inexpensive removable format. Typically, a removable cartridge holding a reel or spool of storage tape is initially loaded into a tape drive. After coupling the storage tape on the cartridge reel to a take-up reel of the tape drive (e.g., via respective leaders), the tape is unwound from the cartridge supply reel, moved past one or more tape head assemblies (e.g., each having one or more tape heads with one or more read/write elements/transducers in the case of magnetic tape) or optical pickup units (OPUs)(e.g., in the case of optical tape) for reading and/or writing of data, and wound onto the take-up reel via a drive motor. Next, the tape is unwound from the take-up reel, moved past the tape heads or OPUs, and wound onto the cartridge. The storage tape is uncoupled from the take-up reel prior to removing the cartridge from the tape drive.

Increased tape storage density is an endless goal that pervades tape design, tape drive design, and the like. Such increases have been achieved in a number of manners such as through the design and use of thinner tape substrates, various data compression techniques, increases in the number of data tracks extending along the tape, corresponding increases in the number of tape heads and/or data read/write elements (e.g., transducers) on each head, and/or the like. However, the number of parallel, longitudinal data tracks which can be established on tape media has been limited by the number of read/write elements which could be fabricated on a head to read/write narrower tracks. In this regard, tape drives have been designed to process a tape using a head having fewer sets of read/write elements than there are tracks on the tape. For instance, the tracks can be divided into groups, each group containing the same number of tracks as there are read/write elements on a particular tape head.

However, there is a practical limit to the ability of a tape head assembly to accurately and reliably record data to and read data from a tape having increasing numbers of increasingly narrow tracks. For instance, the various read/write elements of a tape head assembly may not always be able to precisely follow respective data tracks on the tape during read/write operations (resulting in read/write inaccuracies) due to factors such as tape edge variations, environmental thermal expansion and contractions, inaccuracies in the formatting of tracks on the tape itself, dimensional and spacing deviations during the manufacturing of the head, and/or the like. In this regard, tape drives include a tape head actuator that can rapidly adjust the position of the tape head assembly relative to the tape under servo control to precisely follow a set of tracks during read and write operations. More specifically, the tape head assembly includes servo read elements for reading servo information previously recorded onto one or more specially recorded servo tracks extending along the tape (e.g., parallel to the data tracks). The tape drive is configured to generate one or more Position Error Signals (PESs)(e.g., each of which provides a measure of a position of one of the servo read elements relative to one of the servo tracks on the tape) based on the servo information read by the servo read elements, where the PESs are employed by a position servo loop to determine the transverse position of the servo elements relative to the servo tracks. The loop then transmits a signal to the actuator to rapidly move the tape head assembly by very small amounts as necessary to enable following of the data tracks.

Another manner of increasing the degree to which the read/write elements of a tape head assembly can precisely follow respective data tracks during tape drive operation is via limiting lateral tape motion (LTM) of the tape in directions perpendicular to the longitudinally extending data tracks. Generally, LTM is the tendency of the tape to move laterally (e.g., in a direction generally perpendicular to the longitudinal direction of motion of the tape through the tape drive during read/write operations) due to poor quality tape media, excessive usage of a tape cartridge, excessive vibration or movement of the tape drive during operation, wobbling of the supply or take-up reel, imperfect tape path guides, and/or the like.

In this regard, LTM sensors mounted within the tape drive may be configured to sense an actual position of one edge of the tape relative to one or more tape path guides (e.g., rollers), a target tape path, and/or the like. When the difference between the actual position and an ideal position is greater than some threshold, corresponding signals may provide feedback to a closed loop control system or unit designed to automatically readjust the lateral position of the tape back to nominal. For instance, the control system or unit may utilize the feedback provided by the LTM sensors to adjust a position (e.g., height, tilt, etc.) of a tape path guide over which the tape travels to cause the tape to move laterally back into a desired position or range that increases the ability of the read/write elements of the tape head assembly to accurately follow their respective tracks (e.g., via the above-discussed processing of PESs).

SUMMARY

While using LTM signals as feedback into a control system to automatically adjust a lateral position of tape during tape drive operation aids in increasing the degree to which tape head assembly read/write elements can accurately follow respective tracks, doing so is an indirect manner of optimizing tape head assembly/tape track alignment. Stated differently, the input signals into the control system for adjusting the lateral positioning of the tape to optimize tape head assembly/data track alignment (i.e., the signals generated by the LTM sensor(s)) are different than the signals which the control system is ultimately trying to optimize or otherwise improve (i.e., the PESs) for use in maintaining tape head assembly/track alignment. For instance, factors such as external vibrations, tape curvature, tape pack wind, and/or the like may result in minimal PESs occurring when the tape is at a non-nominal lateral tape position.

In this regard, disclosed herein is a closed loop servo control system that dynamically adjusts a lateral and/or angular position of tape (e.g., a tape path of the tape) within the tape drive (e.g., relative to a longitudinal direction of movement of the tape) using PESs generated by the tape drive as feedback within the system to enhance tape drive performance. That is, instead of utilizing LTM signals to adjust a lateral position of a tape within a tape drive, the disclosed system utilizes a more direct and/or objective measure of how closely the tape head assembly is following one or more tracks, such as generated PESs, to progressively and/or actively guide the tape (e.g., via tilting or otherwise adjusting one or more tape path guides via one or more servo actuators) until subsequently generated PESs are optimized or otherwise within a particular range of "goodness" (or above a particular goodness threshold). Accordingly, PESs generated within a tape drive (and/or PES metrics) may be used as feedback in the disclosed control system to both position/move the tape head assembly relative to the tape as necessary to precisely follow one or more particular data tracks in addition to positioning/moving the tape relative to a reference position or location to facilitate the precise following of the one or more data tracks by the tape head assembly.

As an example, a tape drive implementing the disclosed closed loop servo control system generates, as part of normal tape drive operation, PESs (e.g., via servo read elements on a tape head assembly reading one or more servo tracks on the tape) which are used by an actuator to laterally move the tape head assembly in an effort to follow one or more data tracks. In conjunction with the foregoing, the PESs (and/or metrics related thereto) are also used as inputs into a servo control module of the control system to adjust a lateral position of the tape relative to some reference location or position (to further enable precise following of the one or more tracks by the tape head assembly). In one arrangement, a particular number of "off-track" PESs (e.g., where each PES is of a magnitude signifying that the tape head assembly has at least momentarily unacceptably drifted offtrack) in a particular timeframe may indicate that the tape has laterally shifted relative to a reference location (e.g., a centerline of a tape path guide) outside of an acceptable range of lateral movement of the tape. In another arrangement, PES metrics such as the standard deviation of the PES signal(s) over a given time or tape length (i.e., PES sigma) may be generated.

Upon receiving such PES metrics as feedback, the disclosed control module may automatically effect the lateral moving of the tape back towards an acceptable position or into an acceptable range, such as a range or position that facilitates the ability of the tape head actuator to precisely follow the one or more tracks with the tape head assembly. The tape may be laterally moved such as by tilting or axially moving a tape path guide (e.g., roller) and/or in other manners. In one arrangement, the tape may be laterally moved until generated PESs and/or metrics related thereto have moved back into or to desired "goodness" range or level (e.g., PESs having magnitudes below a particular threshold level, a total number of off-track PESs below a threshold number within a particular timeframe, and/or the like). For instance, PES metrics such as PES sigma could be evaluated in successive time increments (e.g., 1 second increments) and corresponding tape path guide adjustments may be made to increase the goodness of the PESs or metrics thereof.

Additionally or alternatively, the disclosed control system may function as a learning system that progressively (e.g., over time) determines an amount of lateral tape movement necessary to return or restore the tape to a desired (e.g., optimal) lateral position. For instance, upon receiving particular PESs or PES metrics, the control module may enact a particular movement of the tape (e.g., via tilting one end of a tape path guide or roller along its rotational axis by 2%), and then reassess the newly generated PESs or PES metrics (i.e., the PESs or PES metrics generated or determined after the tilting of the tape path guide). The disclosed system may or may not then take further action based on the newly generated PESs or PES metrics. For example, upon determining that the newly generated PESs or PES metrics have improved in one or more regards, the control module may maintain the above-mentioned 2% tilt, reduce the 2% tilt, and/or the like.

Conversely, upon determining that the newly generated PESs or PES metrics have declined or otherwise worsened, the control module may enact a 3% tilt, tilt the tape path guide in a different direction, axially move the tape path guide a particular amount, move another tape drive component, and/or the like. Over time, the disclosed system may store various types and/or degrees of movement of the tape path guide(s) and/or other tape drive components (e.g., in memory of the control system) operable to return the tape to or into an acceptable position or range (e.g., that facilitates the ability of the tape head actuator to precisely follow the one or more tracks with the tape head assembly). Among other advantages, the disclosed system may serve to reduce the number, quantity or magnitude of offtrack PESs, eliminate or at least reduce the need for edge guiding features such as opposing flanges on the tape path guides (e.g., which can lead to tape edge distortion and thus reduction in tape quality, excessive vibration or movement of the tape during tape drive operations, and/or the like, all of which can lead to increased PESs quantities and/or magnitudes), and/or the like. The learning system may function in conjunction with or separate from movement of the tape head assembly relative to the tape via the tape head actuator.

In one aspect, a method for dynamically adjusting a tape path of tape within a tape drive includes passing tape over at least a first tape path guide in the tape drive; sensing servo tracks on the tape with servo read elements of a tape head assembly as the tape moves past the tape head assembly in a longitudinal direction within the tape drive; generating PESs based on the sensed servo tracks, where each PES is indicative of a position of one of the servo read elements of the tape head assembly relative to one of the servo tracks on the tape; and moving the first tape path guide (e.g., tilting, sliding, axially moving, etc.) based at least in part on the generated PESs (e.g., to adjust the tape path).

For instance, the disclosed method may include determining metrics of the generated PESs (e.g., a quantity of PESs that each indicate an off-track of the tape head assembly relative to the servo tracks within a particular timeframe, a total percentage of the time frame for which the tape head assembly was off-track, and/or the like), where the moving includes moving the first tape path guide when the determined metrics are above a threshold level or degree. Additionally or alternatively, the method may include generating additional PESs based on the sensed servo tracks; and determining metrics of the additional generated PESs, where the first type path guide is moved until the metrics of the additional generated PESs are below the threshold level or degree (e.g., until the additional generated PESs have been optimized).

In another aspect, a dynamic tape path adjustment system for a tape drive includes a tape head assembly for performing data writing and/or reading operations on a tape, a tape path guide over which the tape passes; and an actuator coupled to the tape path guide for moving the tape path guide. The tape head assembly includes a plurality of servo read elements for sensing respective servo tracks written on the tape and, in response, generating respective position error signals (PESs), where each PES is indicative of a position of one of the servo read elements relative to a respective one of the servo tracks. The actuator is configured to steer the tape (e.g., by moving the tape path guide) to modify or control metrics related to the generated PESs (e.g., until the PES metrics have been at least substantially optimized).

In a further aspect, a tape drive includes a tape head assembly for performing data writing and/or reading operations on a tape, where the tape head assembly includes a plurality of servo read elements for sensing respective servo tracks written on the tape and then generating respective position error signals (PESs), and where each PES is indicative of a position of one of the servo read elements relative to a respective one of the servo tracks. The tape drive also includes a tape path guide over which the tape passes, a first controller moving the tape head assembly relative to the servo tracks based at least in part on the generated PESs, and a second controller moving the tape path guide based at least in part on the generated PESs.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein is a closed loop servo control system that uses PESs generated by a tape drive during longitudinal movement of a tape through the drive as feedback to dynamically adjust a lateral and/or angular position of tape to enhance tape drive performance (e.g., the ability of a tape head assembly to precisely follow one or more data and/or servo tracks on the tape). The PESs and/or PES metrics are used as feedback into the system to adjust a lateral position of the tape (e.g., via signaling a servo actuator to tilt a tape path guide) until subsequently generated PESs or PES metrics (which are directly indicative of how precisely the tape head assembly is following one or more tracks on the tape) are optimized or have at least moved back into an acceptable range or to acceptable levels. The disclosed control system facilitates achieving increased stringencies on PES minimization that come with increased tape drive magnetic track densities.

With initial reference to FIG. 1, a schematic illustration of a tape drive 100 that may embody the disclosed active tape guiding servo control system (discussed in more detail below) is presented. As shown, tape media such as magnetic tape 200 (e.g., having a number of layers such as a base substrate, one or more underlayers, one or more magnetic coatings, and/or the like) may be wound between a storage reel 310 of a cartridge 300 (e.g., 8 mm, 4 mm, ¼ inch, ½ inch formats, and/or the like) and a take-up reel 110 of the tape drive 100 through a tape path 104. The tape path 104 may be generally defined by a number of components such as tape path guides 106 (e.g., rollers), at least one tape head assembly 108, and/or the like. As the tape drive 100 moves the tape 200 along the tape path 104 (e.g., via one or more drive motors, tape drive controller, etc.) in one of first and second opposing longitudinal directions in the tape drive 100, the tape 200 is generally guided by the tape path guides 106 and passes by tape head assembly 108. The tape head assembly 108 includes one or more (e.g., two) tape heads (not shown), where each tape head includes one or more transducers (not shown) for writing and/or reading data to and/or from the tape 200.

The tape path guides 106 are generally designed to stabilize the tape 200 as it moves past tape head assembly 108 and are operable to "steer" the tape 200 as will be discussed in more detail below. In one arrangement, one or more of the tape path guides 106 may be roller guides having smooth cylindrical surfaces with low coefficient of friction with tape 200 and that are rotatable about respective rotational axes 107. In another arrangement, one or more of the tape path guides 106 may be rollers with grooved or other surface treatments to increase friction. In another arrangement, one or more of the tape path guides 106 may be fixed relative to the tape 200 with the tape 200 sliding over such tape path guides 200 or flying on entrained air over such tape path guides 106. The tape path guides 106 may be free of end flanges to guide respective edges of the tape 200 as such flanges may in some cause damage to the tape 200 and/or affect the quality of the tape 200. Optionally, one or more of the tape path guides 106 may have flanges to limit tape 200 from slipping off the tape path guides 106 in cases of extreme tape movement (e.g., as opposed to for steering the tape 200).

Figure 1:
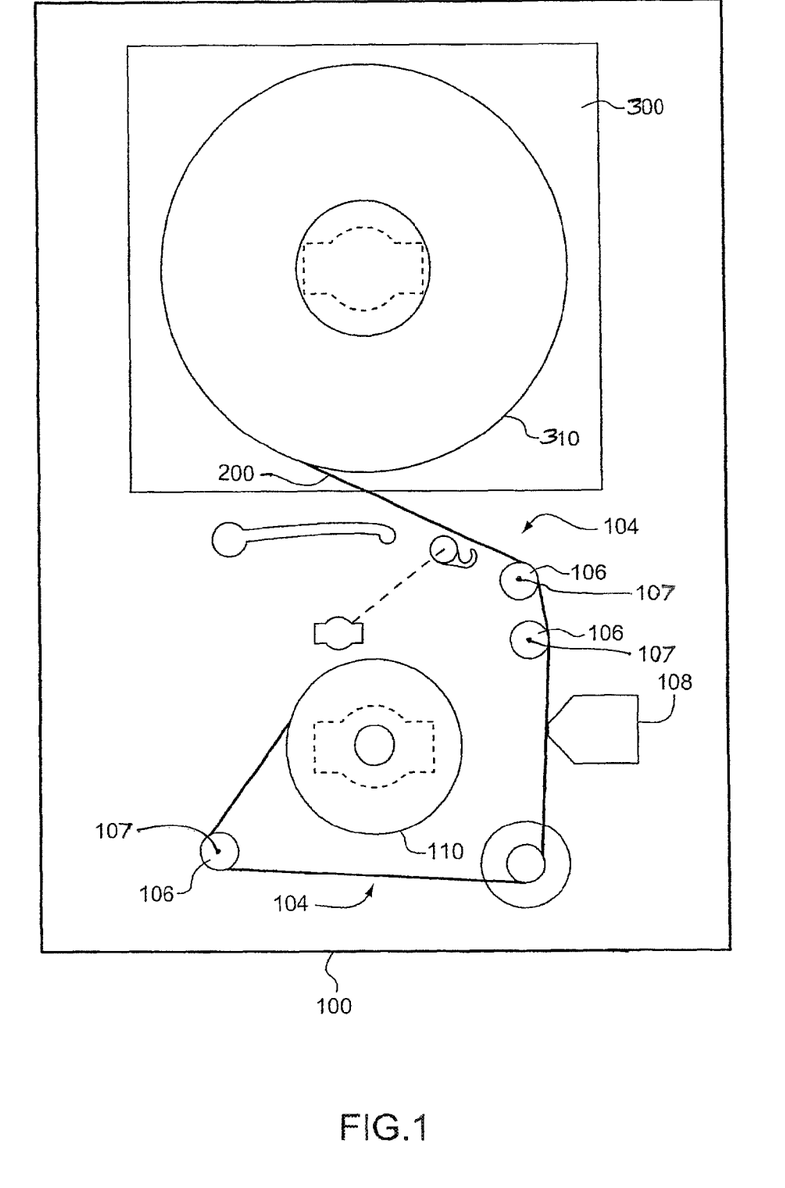
FIG. 1 is a schematic diagram of a tape drive that may implement the disclosed PES feedback control system for active guiding of tape within the tape drive.

While not shown in FIG. 1, the tape drive 100 may include at least one control unit (e.g., in the form of a circuit board including any appropriate arrangement of memory, logic, software, processors, circuitry, and/or the like) to control operation of the tape path guides 106, tape head assembly 108, drive motor, and/or the like as part of reading and/or writing of data, maintaining alignment of the tape head assembly 108 with tracks on the tape 200, and/or the like. The particular arrangement of the control unit will be apparent to those skilled in the art in the context of the following discussion. Furthermore, it is to be understood that not all components of the tape drive 108 have been necessarily illustrated or described in the interest of clarity. The tape drive 100 may be used as a stand-alone unit within a computer to provide backup, within a robotic tape cartridge handling system to receive tape cartridges handled by robotic arms, and/or the like.

Generally, the tape 200 includes servo control information that is used by the control unit of tape drive 100 to align the tape head assembly 108 with one or more tracks on the tape 200. For instance, the servo control information may be a repeating servo pattern of magnetic flux transitions. Alternatively, optical servo tracks also may be found on the tape 200. In any event, the tape drive 100 can read the servo control information and generate corresponding PESs each of which is generally indicative of a position of one of the servo read elements of the tape head assembly 108 relative to one of the servo tracks on the tape 200. The control unit processes the generated PESs to determine whether a read/write element or transducer of the tape head assembly 108 is unacceptably "off-track" relative to a particular track, and then transmits corresponding signals to a tape head assembly actuator to move the tape head assembly 108 (e.g., in a lateral direction relative to the longitudinal extent of the tape 200) so as to more accurately follow the particular track(s).

Figure 2:
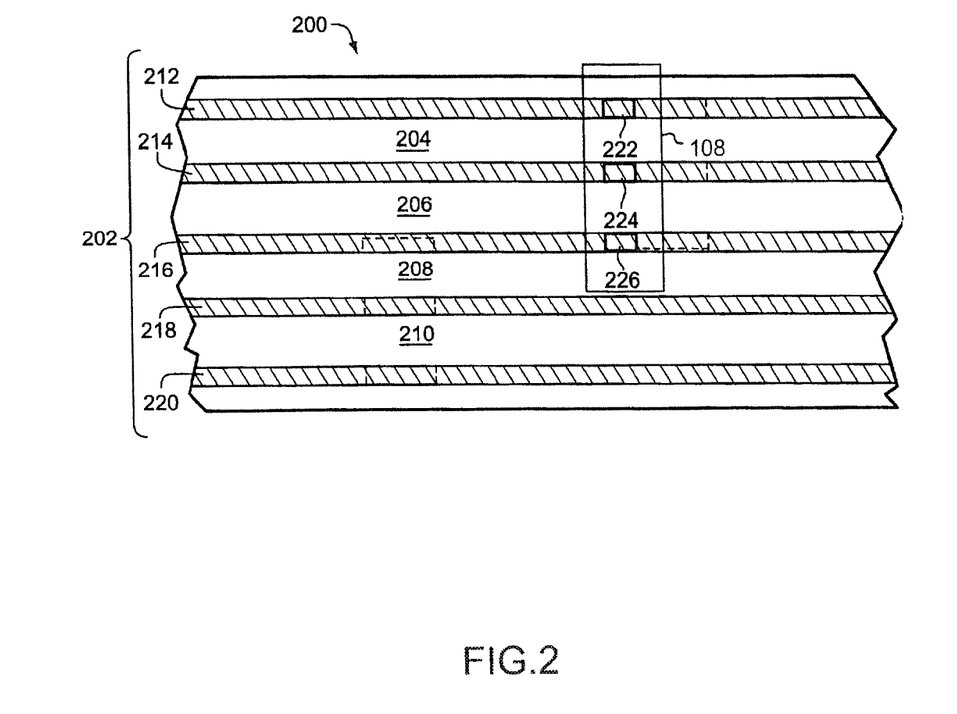
FIG. 2 is a schematic plan view of a portion of the tape of FIG. 1 and illustrating data and servo tracks disposed over one surface along a length of the tape.

Turning now to FIG. 2, a schematic plan view of a portion of the tape 200 illustrating data and servo tracks across a width 202 of a surface of the tape 200 is provided. Tape 200 illustrates a plurality of data stripes 204, 206, 208, 210 that are separately by a plurality of servo stripes 212, 214, 216, 218, 220. Each of the data stripes 204, 206, 208, 210 may include a plurality of physical wraps (not shown), where each physical wrap generally extends along a length of the tape 200 (e.g., from the left towards the right side of FIG. 2) and includes a plurality of data tracks onto or from which data may be written or read by the tape head assembly 108 in any appropriate manner. Each of the servo stripes 212, 214, 216, 218, 220 may include one or more servo tracks that store or otherwise contain any appropriate arrangement of servo control information for use in aligning the tape head assembly 108 with the various data stripes 204, 206, 208, 210 (e.g., with data tracks therein).

As also shown in FIG. 2, the tape head assembly 108 may include a plurality of servo read elements 222, 224, 226 (e.g., transducers) that may generally be positioned over a corresponding number of the servo stripes (e.g., over servo stripes 212, 214, 216 in FIG. 2). The servo stripes 212, 214, 216, 218, 220 may generally employ various patterns or frequency regions to allow precise tape head assembly to tape positioning to allow for more accurate access of data from data stripes 204, 206, 208, 210. Generally, a servo control system in the tape drive 100 (and/or the servo read elements 222, 224, 226 themselves) generates PESs based on differences in signal amplitudes generated by servo read elements 222, 224, 226 during the reading of information from servo tracks of the servo stripes 212, 214, 216, 218, 220. Additionally or alternatively, signal phase or timing difference data may be used to generate PESs. In any case, the servo control system may utilize PESs to determine a transverse or lateral position or distance of a servo read element 222, 224, 226 relative to a respective servo stripe 212, 214, 216, 218, 220 (e.g., or servo track thereof), and then trigger or signal the tape head assembly actuator to move the tape head assembly 108 back "on-track" (e.g., so that the servo read elements 222, 224, 226 are generally aligned with respective servo stripes 212, 214, 216 and thus so that read/write elements of the tape head assembly 108 are generally aligned with respective data tracks of the data stripes 204, 206, 208, 210 to improve the accuracy of read/write operations.

As discussed previously, LTM of tape during tape drive operation can inhibit the ability of a servo control system to accurately or precisely maintain a tape head assembly "on-track" with the various servo and data tracks of the tape. Some current solutions to LTM employ LTM sensors mounted within the tape drive to sense an actual position of the tape relative to one or more tape path guides (e.g., rollers), a target tape path, and/or the like. When the difference between the actual position and an ideal position is greater than some threshold, corresponding signals may provide feedback to a closed loop control system to automatically adjust a position (e.g., height, tilt, etc.) of a tape path guide over which the tape travels to steer the tape back into a desired lateral position or range that increases the ability of the read/write elements of the tape head assembly to accurately follow their respective tracks (e.g., via the above-discussed processing of PESs).

However, use of LTM signals as feedback into a control system to automatically adjust a lateral position of tape during tape drive operation is an indirect manner of optimizing tape head assembly/tape track alignment. That is, the input signals into the control system (i.e., the signals generated by the LTM sensor(s)) for adjusting the lateral positioning of the tape to optimize tape head assembly/data track alignment are different than the signals that the control system is ultimately trying to optimize (i.e., the PESs) for use in maintaining tape head assembly/track alignment.

Figure 3:
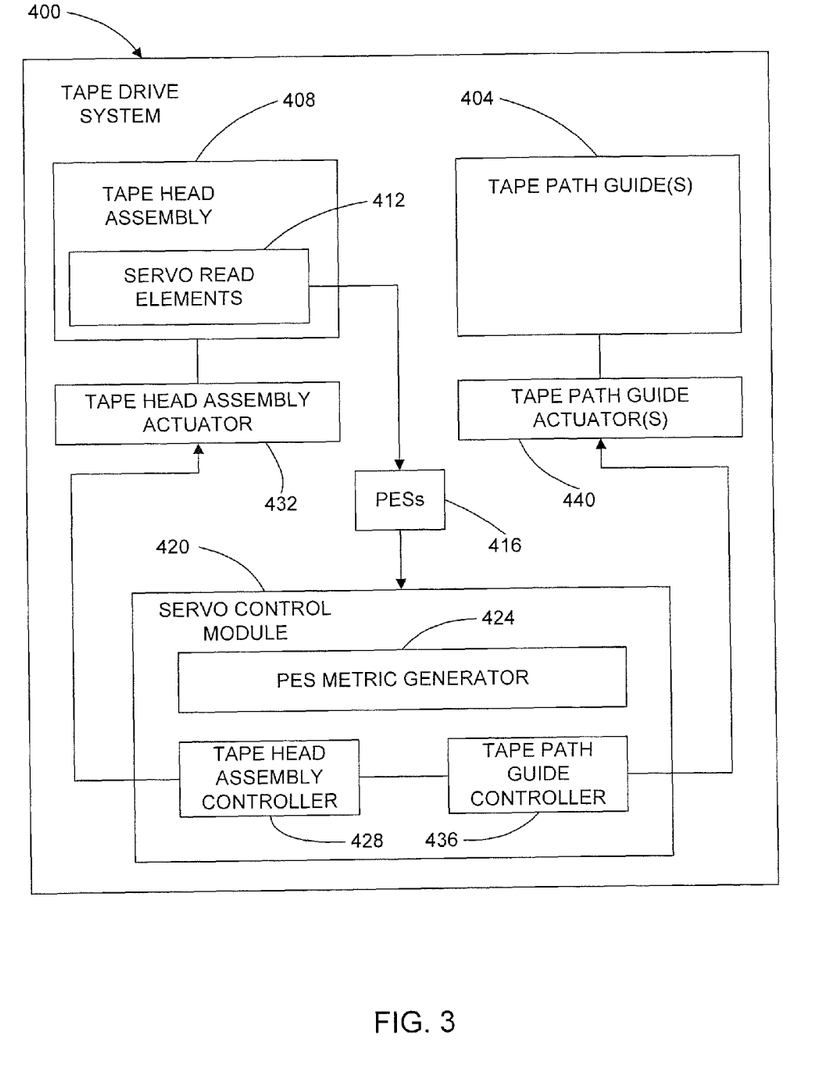
FIG. 3 is a block diagram of a PES feedback control system for active tape guiding according to one embodiment.

In this regard, FIG. 3 illustrates a tape drive closed loop servo control system 400 that uses PESs generated by a tape drive during longitudinal movement of a tape through the drive as feedback to dynamically adjust a lateral and/or angular position of tape (e.g., by signaling an actuator to move a tape path guide in one or more manners) to enhance tape drive performance by increasing the ability of a tape head assembly to precisely follow one or more data and/or servo tracks on the tape (e.g., via the processing of the PESs). For instance, the tape drive system 400 may be implemented within or otherwise as part of a tape drive (e.g., tape drive 100) having a tape (e.g., tape 200) moving therewithin for use in performing writing and/or reading operations on the tape. As part of the discussion of the tape drive system 400, reference will also be made to FIG. 4 which illustrates a method 500 of performing active tape guiding via closed loop control of tape guide adjustment using PES metrics as feedback into the loop.

Figure 4:
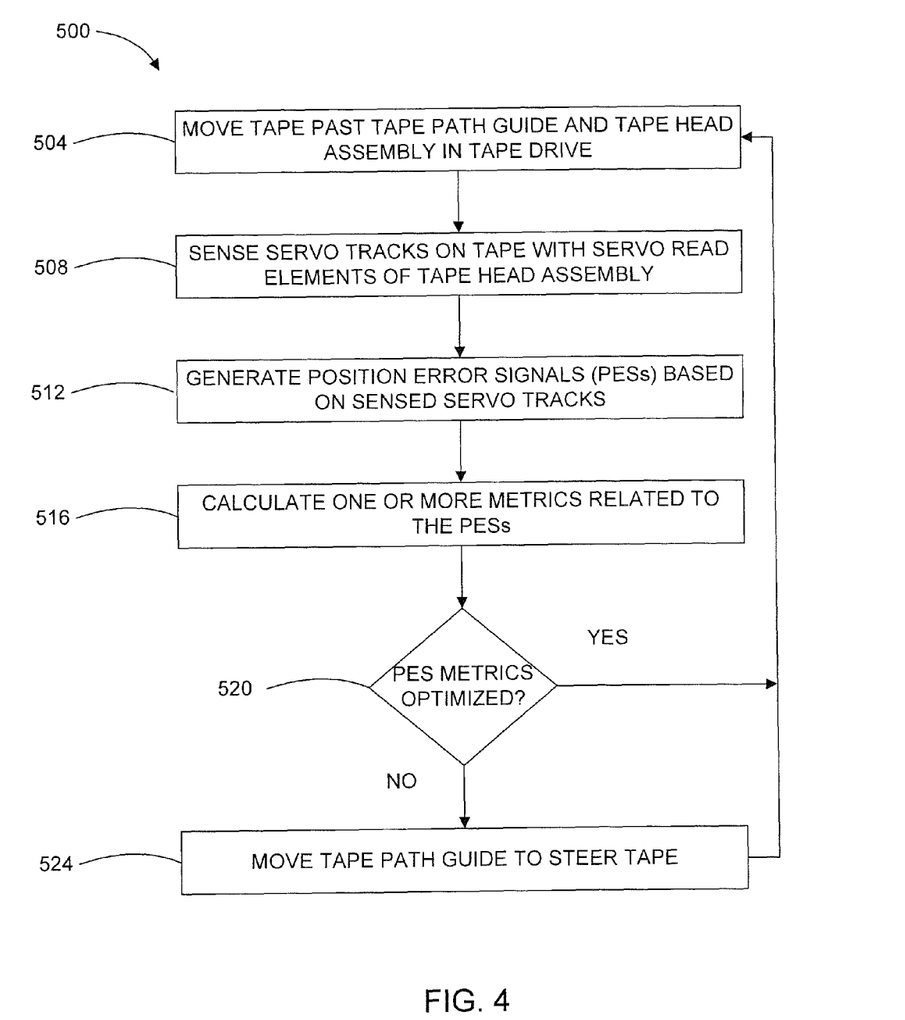
FIG. 4 is a flow diagram illustrating a method for performing active tape guiding via closed loop control of tape guide adjustment using PES metrics as feedback into the loop.

Generally, the method 500 may include moving 504 tape (e.g., tape 200) past one or more tape path guides 404 (e.g., tape path guides 106 of the tape drive 100 of FIG. 1) and at least one tape head assembly 408 (e.g., tape head assembly 108) in a tape drive. The method 500 also includes sensing 508 servo tracks on the tape (e.g., servo tracks of servo stripes 212, 214, 216, 218, 220) with servo read elements 412 (e.g., servo read elements 222, 224, 226) of the tape head assembly 408, and then generating 512 PESs 416 based on the sensed servo tracks. As shown in FIG. 3, the servo read elements 412 themselves may both read the servo tracks and generate corresponding PESs 416. In other arrangements, the servo read elements 412 may read the servo tracks and then pass the read information to a servo control system of the tape drive which may function to generate the corresponding PESs 416.

In any event, the method 500 may include determining, obtaining and/or calculating 516 one or more metrics related to the generated PES that broadly provide an indication of "goodness" of the generated PESs. Stated differently, the calculated PES metrics more or less signify how accurately or precisely the tape head assembly 408 is following tracks on the tape 200 (e.g., how well the servo read elements 412 are following or tracking the servo tracks of the tape 200). With reference to FIG. 3, the tape drive system 400 may include a servo control module 420 (e.g., the above-discussed servo control module of FIG. 1) that includes any appropriate arrangement of logic, software, and/or the like broadly operable to analyze the generated PESs and trigger or otherwise cause appropriate adjustments to the tape path guides 404 and tape head assembly 408 in an effort to optimize PES metrics and thereby improve tape head assembly/tape track alignment. As shown, the servo control module 420 may include a PES metric generator 424 operable to receive the generated PESs during operation of the tape drive 100 and generate one or more corresponding metrics indicative of a relative goodness of the PESs. In one arrangement, the PES metric generator 424 may generate metrics at regular time intervals (e.g., every 1 second and/or the like). For instance, metrics such as a quantity of "off-tracks" of the tape head assembly 408 relative to tracks on the tape 200 (e.g., where an off-track may be when a PES is of a level or degree above a threshold level or degree) within a particular time interval may be computed. As another example, the standard deviation of the PES signal(s) over a time interval (i.e., PES sigma) may be computed or otherwise obtained. In some arrangements, two or more metrics may be generated and/or utilized.

Figure 5:
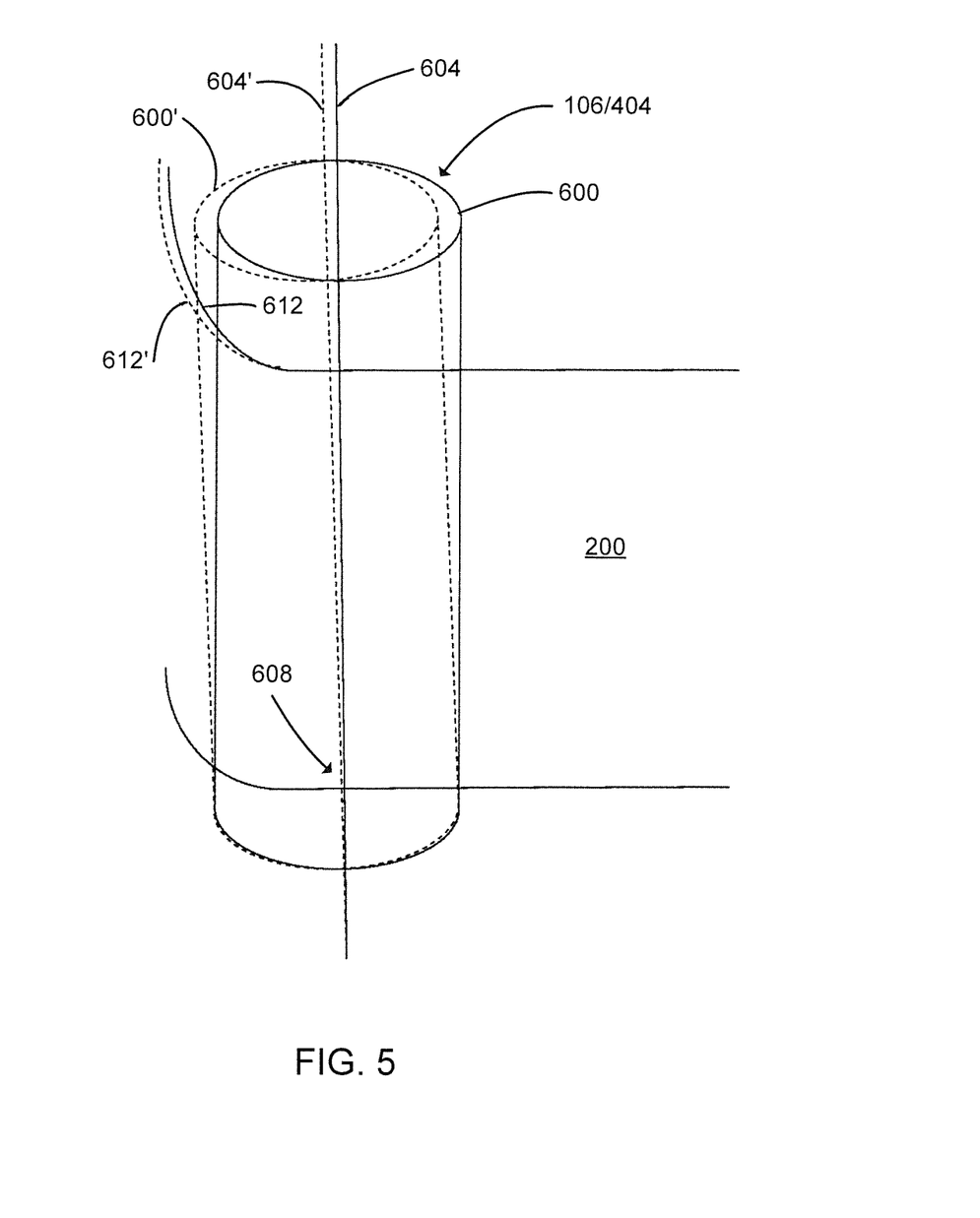
FIG. 5 is a schematic view of a movable tape path guide.

The method 500 of FIG. 5 may then query 520 whether the one or more PES metrics have been or are otherwise optimized. In other words, the query 520 may ask whether the PES metrics generated by the PES metric generator 424 of the tape drive system 400 have dropped underneath a particular threshold or are otherwise within an acceptable range (e.g., a level or range indicative of accurate or precise following of data/servo tracks of the tape by the tape head assembly). With reference to the above example, the control unit 420 may determine whether the quantity of off-tracks of the tape head assembly 408 within the particular time frame is below a threshold quantity of off-tracks, where a positive determination would indicate that the particular PES metric has been substantially optimized (e.g., the generated PESs are in an acceptable range of goodness) and where a negative determination would indicate that the particular PES metric is not yet optimized (e.g., the PESs are not within an acceptable range of goodness). For instance, the PES metric may have been below the threshold quantity and, over time, have moved in a first/upward direction so as to cross or otherwise be above the threshold quantity. In this regard, the query at 520 may be asking whether the PES metric has moved in a second/downward direction so as to cross or otherwise be below the threshold quantity. Of course, depending upon the PES metric, PES optimization may result when a metric is above a particular threshold instead of below a particular threshold.

In the event that one or more PES metrics are determined to be optimized at 520, the method 500 may flow back to 504 to continue to move the tape past the tape path guides 404 and tape head assembly 408. As part of the moving 504, a tape head assembly controller 428 may continue receiving and processing PESs 416 and triggering a tape head assembly actuator 432 as appropriate to enact lateral movement of the tape head assembly 408 so as to appropriately align the tape head assembly 408 (e.g., data and/or servo read/write elements of the assembly) with corresponding tracks on the tape 200 (e.g., tracks of data stripes 204, 206, 208, 210 and/or servo stripes 212, 214, 216, 218, 220 in FIG. 2).

If the one or more PES metrics are determined to not be optimized at 520, the method 500 may move 524 one or more of the tape path guides 404 (e.g. one or more of tape path guides 106 in FIG. 1) so as to appropriately steer the tape 200 (e.g., in a lateral direction) as the tape is being moved in the longitudinal direction through the tape drive 100, and then flow back to continue to perform the moving 504, sensing 508, generating 512, and calculating 516 steps before reassessing 520 whether the PES metrics (e.g., metrics of PESs generated subsequent to the moving 524) are or have been optimized (e.g., have moved into the acceptable range or below the acceptable threshold). As shown in FIG. 3, a tape path guide controller 436 of the servo control module 420 may appropriately trigger at least one tape path guide actuator 440 to enact one or more types of movement of at least one tape path guide 404 (e.g., so as to move the tape 200 in a lateral direction relative to the tape path guide 404 or tape path). Subsequently, the PES metric generator 424 may generate PES metrics with PESs 416 generated after triggering of the tape path guide actuator 440, and the servo control module 420 may then determine whether such subsequently generated PES metrics are or have been optimized.

The at least one tape path guide 404 may be moved in a number of manners to enact steering of the tape 200 (e.g., lateral movement away from or towards an end of the tape path guide 404, upward and/or downward movement, etc.) during operation of the tape drive 100. In one arrangement, a tape path guide actuator 440 of a respective one of the tape path guides 404 may be configured to move or change an orientation of an axis of the tape path guide 404 (e.g., an axis substantially perpendicular to the longitudinal direction of movement of the tape across the tape path guide 404) to enact steering of the tape 200 relative to the tape path guide 404 (e.g., lateral movement of the tape or in other words movement of the tape 200 in a direction parallel to the axis).

As an example, the tape path guide actuator 440 may be operable to tilt the tape path guide 404 along the axis to enact lateral steering of the tape. Turning to FIG. 5, for instance, the tape path guide actuator 440 (not shown in FIG. 5) may be configured to tilt the rotational axis 107 of the tape path guide 106/404 (i.e., tilt the tape path guide 106/440 from a first position 600 to a second position 600' along the rotational axis 107) by an angle α from a first position 604 to a second position 604' about a fulcrum 608 (e.g., where the first and second positions 604, 604' of the rotational axis 107 cross). Accordingly, at least one edge of the tape 200 (and thus of the tape path) has moved laterally from a first position 612 to a second position 612'. While the tilt fulcrum 608 has been shown near the bottom of the tape path guide 106/404 in FIG. 5, the fulcrum 608 may be positioned at numerous other locations, including location other than those coincident with first and second positions 604, 604' of the rotational (or other) axis 107.

Additionally or alternatively, the tape path actuator 440 can be configured to translate the tape path guide 106/404 in one, two or three dimensions. For example, the tape path actuator 440 can move the tape path guide 106/404 upwardly and/or downwardly with the axis 107 (i.e., move the entire rotational axis 107 upwardly and/or downwardly, before or after tilting the axis 107, if at all) so as to correspondingly steer the tape 200 upwardly or downwardly. As another example, the tape path actuator 404 can move the tape path guide 106/404 laterally or side to side (i.e., axially move the tape path guide 106/404 along rotational axis 107, before or after tilting and/or raising and/or lowering the axis 107, if at all). One or more various combinations of movements of one or more of the tape path guides 404 may be enacted, and at least some of the tape path guides 404 may be moved in one or more different manners.

In the event that the PES metrics generated after any appropriate movement of the tape path guide(s) 404 have not been optimized, the method 500 of FIG. 4 may again proceed to move 524 (e.g., perform a different tilting operation of) one or more of the tape path guides 404 (e.g., via the tape path guide controller 436 triggering the tape path guide actuator(s) 440 of the one or more tape path guides 404) and then flow back to continue to perform the moving 504, sensing 508, generating 512, and calculating 516 steps before reassessing 520 whether the PES metrics (e.g., metrics of PESs generated subsequent to the moving 524) are or have been optimized (e.g., have moved into the acceptable range or below the acceptable threshold). In some arrangements, such as when the disclosed tape drive system 400 is encountering a new type of tape 200, a new arrangement of tape path guides 404, and/or the like, initial movements of the tape path guides 404 and/or other components upon determining that PESs or PES metrics are sub-optimal may be at least somewhat randomly chosen (e.g., as part of trial and error). Over time, the disclosed system 400 may be operable to learn and store those types of movements that are more likely than other to result in optimized PESs or PES metrics which may be used in subsequent operations. For instance, the disclosed system 400 may maintain any appropriate database or table of tape drive types (e.g., number of tape path guides 404, speeds of operation, etc.), tape types, PES metrics, and/or the like linked with particular tape path guide 404 movements that may be configured to optimize the PESs or PES metrics.

It is also noted that the tape head assembly controller 428 and tape path guide controller 436 may work in conjunction to respectively trigger the tape head assembly actuator 432 and tape path guide actuator 440 and thereby appropriately move the tape head assembly 408 and tape path guide(s) 404 to effect substantially precise tracking of the servo and data tracks on the tape 200 by the tape head assembly 408. For instance, as part of determining the type(s) and degree(s) of movement(s) to make to the tape path guide(s) 404 so as to steer the tape 200 in one or more particular manners, the tape path guide controller 436 may communicate with the tape head assembly controller 428 to coordinate the movements of the tape head assembly 408 relative to servo/data tracks of the tape 200 with those of the tape path guide(s) 404 for steering the tape 200 laterally, upwardly, downwardly, and/or the like.

The disclosed closed loop tape drive servo control system advantageously optimizes the objective function of the system by using PES metrics as feedback to control tape path guide positioning and steering of tape rather than an indirect measure such as signals generated by LTM sensors. As a result, more precise and accurate following of servo/data tracks of a tape by a tape head assembly and thus more efficient tape drive operation can be achieved.

It will be readily appreciated that many additions and/or deviations may be made from the specific embodiments disclosed in the specification without departing from the spirit and scope of the invention. For instance, while the tape drive presented herein has been disclosed in the context of magnetic tape having one or more magnetic layers/coatings therein, the disclosed system could also be used with other forms of tape media (e.g., optical tape having one or more encoding or recording layers on which data can be written to and/or read from by the respective optical pickup units (OPUs). Furthermore, the tape drive 100 illustrated in FIG. 1 has only been presented for purposes of discussion; thus, the disclosed system may be utilized or embodied in other forms of tape drives.

Embodiments disclosed herein can be implemented as one or more computer program products, i.e., one or more modules of computer program instructions encoded on a computer-readable medium for execution by, or to control the operation of, data processing apparatus. For example, the logic or software of the servo control module 420 may be provided in such computer-readable medium of the tape drive system 400 or tape drive 100 (e.g., on a circuit board) and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the tape drive system 400 or tape drive 100 may encompass one or more apparatuses, devices, and machines for processing data, including by way of example a programmable processor, a computer, or multiple processors or computers. In addition to hardware, the tape drive system 400 or tape drive 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A method for dynamically adjusting a tape path of tape within a tape drive, comprising:

passing tape over a tape path guide in a tape drive;

sensing servo tracks on the tape with servo read elements of a tape head assembly as the tape moves past the tape head assembly in a longitudinal direction within the tape drive;

generating position error signals (PESs) based on the sensed servo tracks, wherein each of the PESs is indicative of a position of at least one of the servo read elements of the tape head assembly relative to at least one of the servo tracks on the tape;

determining metrics of the generated PESs; and moving the tape path guide based at least in part on the generated PESs, wherein the moving includes moving the tape path guide when the determined metrics are above a threshold level or degree.

2. The method of claim 1, wherein the PES metrics are determined at regular time intervals.

3. The method of claim 1, further comprising after the moving:

generating additional PESs based on the sensed servo tracks; and determining metrics of the additional generated PESs, wherein the type path guide is dynamically moved until the metrics of the additional generated PESs are below the threshold level or degree.

4. The method of claim 1, wherein the metrics comprise a quantity of PESs that each indicate an off-track of the tape head assembly relative to the servo tracks within a particular timeframe.

5. The method of claim 1, further comprising after the moving:

generating additional PESs based on the sensed servo tracks; and determining metrics of the additional generated PESs, wherein the moving comprises steering the tape until the metrics of the additional generated PESs have been at least substantially optimized.

6. The method of claim 1, wherein the moving comprises: tilting the tape path guide.

7. The method of claim 6, wherein the tape path guide comprises a roller, and wherein the tilting comprises:

tilting the roller along a rotational axis of the roller in at least a first dimension.

8. The method of claim 7, wherein the tilting comprises: tilting the roller along the rotational axis in first and second dimensions.

9. The method of claim 1, further comprising:

moving the tape head assembly relative to the tape based at least in part on the generated PESs to follow the servo tracks.

10. A method for dynamically adjusting a tape path of tape within a tape drive, comprising:

passing tape over a tape path guide in a tape drive;

sensing servo tracks on the tape with servo read elements of a tape head assembly as the tape moves past the tape head assembly in a longitudinal direction within the tape drive;

generating position error signals (PESs) based on the sensed servo tracks, wherein each of the PESs is indicative of a position of at least one of the servo read elements of the tape head assembly relative to at least one of the servo tracks on the tape; and moving the tape path guide based at least in part on the generated PESs, wherein the method further comprises after the moving:

generating additional PESs based on the sensed servo tracks; and determining metrics of the additional generated PESs, wherein the moving comprises steering the tape until the metrics of the additional generated PESs have been at least substantially optimized, and wherein the metrics of the additional generated PESs have been at least substantially optimized when a quantity of PESs that each indicate an off-track of the tape head assembly relative to the servo tracks has dropped below a threshold quantity within a particular timeframe.

11. A dynamic tape adjustment system for a tape drive, comprising:

a tape path guide over which a tape passes;

a tape head assembly for performing data writing or reading operations on the tape;

wherein the tape head assembly includes a plurality of servo read elements for sensing respective servo tracks written on the tape and, in response, generating respective position error signals (PESs); and wherein each of the PESs is indicative of a position of one of the servo read elements relative to a respective one of the servo tracks;

an actuator coupled to the tape path guide that is configured to steer the tape to modify metrics related to the generated PESs; and a control module that obtains the PES metrics and triggers the actuator to move the tape path guide based on the PES metrics, wherein the control module triggers the actuator to move the tape path guide when the PES metrics have crossed at least one threshold level or degree in a first direction.

12. The system of claim 11, wherein the control module ceases triggering of the actuator when the PES metrics have crossed the at least one threshold level or degree in a second direction.

13. The system of claim 11, wherein the actuator is configured to tilt the tape path guide along an axis through the tape path guide, axially move the tape path guide along the axis, and/or move the tape path guide with the axis.

14. The system of claim 11, wherein the tape path guide is free of edge features for guiding the tape.

* * * * *